June 3, 1930.  R. HILDEBRAND  1,761,561
COMBINED INTERNAL AND EXTERNAL COMBUSTION ENGINE
Filed Feb. 8, 1926   2 Sheets-Sheet 1

Inventor Richard Hildebrand

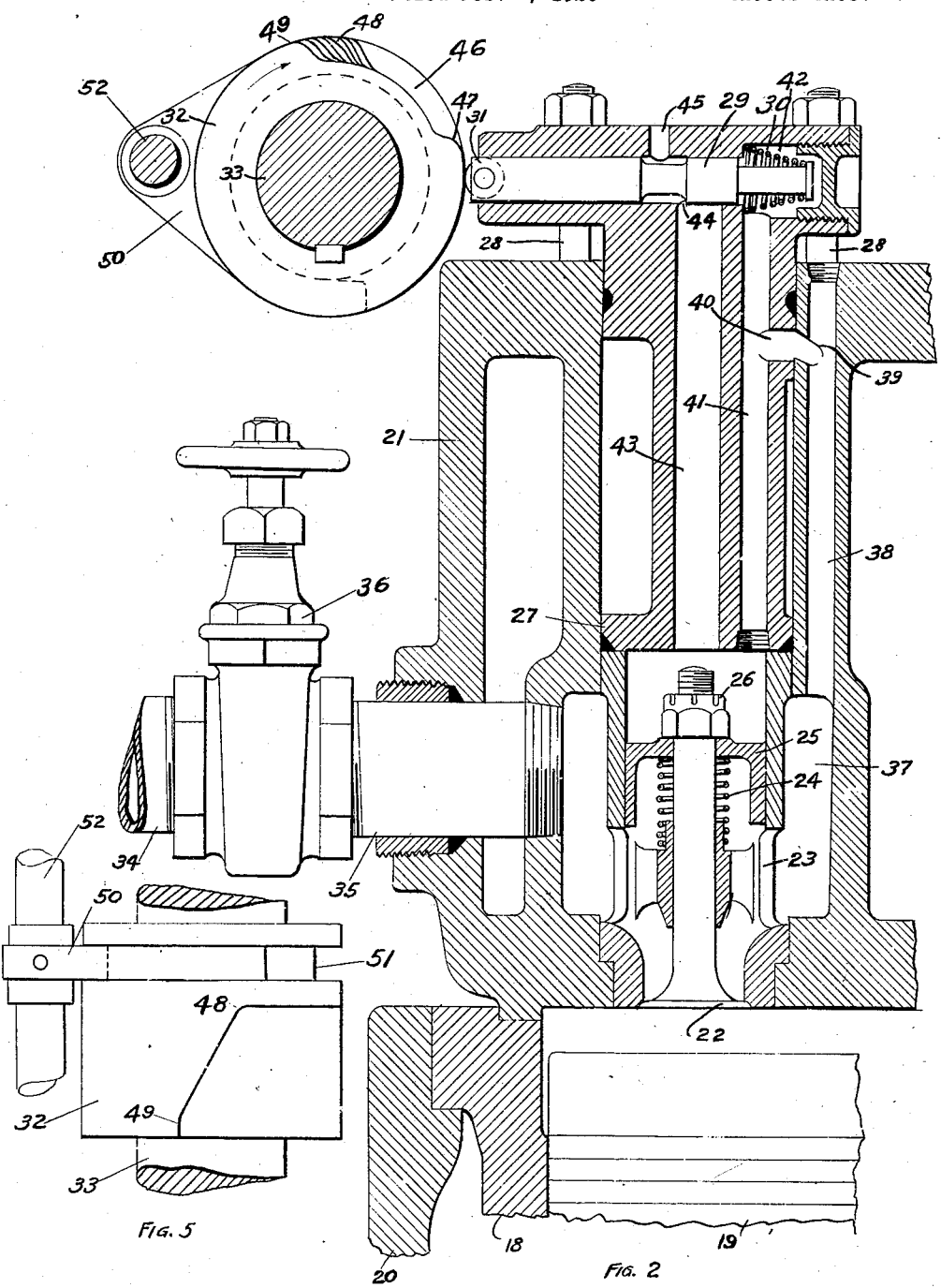

Patented June 3, 1930

1,761,561

UNITED STATES PATENT OFFICE

REINHARD HILDEBRAND, OF WEBSTER GROVES, MISSOURI

COMBINED INTERNAL AND EXTERNAL COMBUSTION ENGINE

Application filed February 8, 1926. Serial No. 86,895.

This invention relates to internal combustion engines in general, particularly to those which have to start under load and which occasionally have to carry an excessive overload as, for instance, in internal combustion engines driving locomotives.

One object of the invention is to provide a novel method by which the mean effective pressure exerted on the working piston of an internal combustion engine can be increased.

Another object is to provide a novel method by which the traction effect of a locomotive driven by an internal combustion engine can be increased.

Another object is to provide a combined internal and external combustion engine of novel construction.

Another object is to provide a combined internal and external combustion engine that is equipped with a means of novel construction for admitting variable quantities of an auxiliary power medium to the cylinder when the engine is operating under an excessive load.

And still another object of my invention is to provide a locomotive of novel construction.

Figure 1:
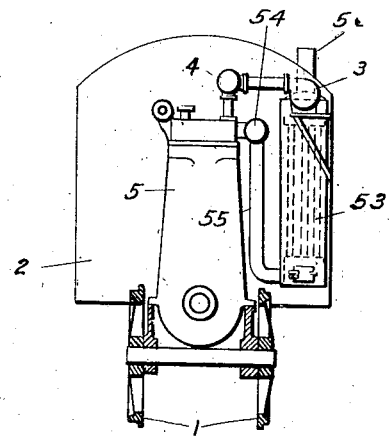
Figure 6:
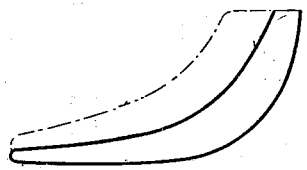
Figure 7:
Figure 3:
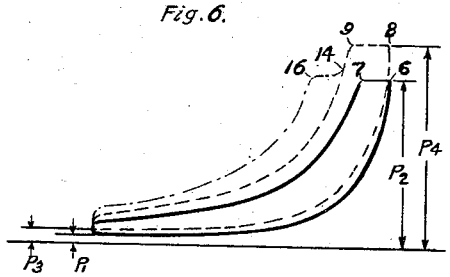
Figure 4:
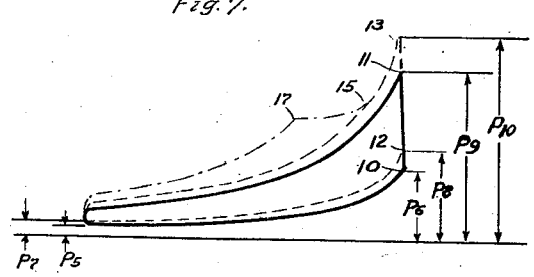

Referring to the drawings: Fig. 1 is a cross section through a locomotive driven by an internal combustion engine embodying my invention. Fig. 2 shows a partial vertical section through the cylinder head, frame, cylinder liner with piston and a valve for admitting an auxiliary power medium suitable to increase the mean effective pressure of an internal combustion engine. Figs. 3 and 4 show the compression, combustion and expansion lines of a typical indicator card of an engine with supercharging working on the Diesel and Otto cycle respectively, and indicate the advantages attained by the use of my invention. Fig. 5 shows the plan view of the cam illustrated in Fig. 2. Figs. 6 and 7 show the compression, combustion and expansion line of a typical indicator card of an engine without supercharging working on the Diesel and Otto cycles respectively.

Referring to Fig. 1: Heretofore, when it was desired to increase the torque on the driving wheel 1 of a locomotive driven by an internal combustion engine 5, that is, when it was desired to increase its mean effective piston pressure above its normal, then an air blower indicated by 3 was started. This blower, being connected to the air intake header 4 of the engine, created and maintained in said header a pressure above the normal one. This increase in pressure in the air intake header increased the pressure and consequently also the weight of the air charge at the beginning of the compression stroke. Thus, by supercharging the weight of the available air for combustion was increased, permitting more fuel to be burned and greater mean effective pressures to be obtained than without supercharging.

The mentioned method of supercharging the working cylinders of the engine with air to increase the rate of combustion has increased the output of the engine to some extent. However, this increase is very limited for reasons which will best be explained in connection with Figs. 3 and 4.

Referring to Fig. 3, it will be noticed that, at normal operation of the engine, the compression line starts with the pressure $p^1$ and terminates at a pressure $p^2$. The combustion of the fuel takes place from the points 6 and 7, whence the expansion begins. When the engine is supercharged the beginning of the compression line starts with the pressure $p^3$ which is higher than pressure $p^1$. Consequently, when supercharging, the compression terminates at a pressure $p^4$ being higher than pressure $p^2$. The combustion, when supercharging, takes place from point 8 to 9 whence expansion begins.

Referring to Fig. 4; when the engine is operated under normal conditions, the compression line begins with the pressure $p^5$ and terminates at a pressure $p^6$. The fuel burns from point 10 to 11 while the crank passes through its dead center position, whence the expansion begins. When the engine is supercharged, the compression line begins with a pressure $p^7$, being higher than pressure $p^5$, and terminates at a pressure $p^8$, being higher than pressure $p^6$. The combustion, when supercharging, is indicated by the line 12 to 13 whence the expansion begins.

It will be seen from Figs. 3 and 4 that the maximum pressure $p^4$ and $p^{10}$ respectively inside of the working cylinders, due to supercharging, is considerably higher than the normal pressure $p^2$ and $p^9$ respectively which is obtained under normal operation of the engines. It is obvious that there is a limit to the above described method of supercharging because there is a limit to the allowable increase of maximum pressure above the normal one inside of the working cylinder. Therefore it is advisable not to excessively supercharge as this would endanger the engine. Generally, a greater increase than 10% of mean effective pressure due to supercharging is considered not advisable because the corresponding maximum pressure becomes prohibitive, although it has been demonstrated that 20 to 30% increase in mean effective pressure can be obtained.

In order to still increase the mean effective pressure as shown in dotted lines in Figs. 3 and 4 without further increase of the maximum pressures $p^4$ and $p^{10}$ respectively, I intend to admit to the working cylinder of the engine an auxiliary power medium during the expansion stroke. It is advisable to admit this medium when the combustion is completed because this medium, if admitted too soon may cause an undesirable chilling effect on the not yet completely burned fuel. In Figs. 3 and 4, the auxiliary power medium is admitted from point 14 to 16 and 15 to 17 respectively, from whence the expansion continues. It will be seen that by admitting an auxiliary power medium a great increase in the mean effective pressure inside of the working cylinder can be obtained without increasing the maximum pressure therein. The admitting of an auxiliary power medium to the working cylinder has another beneficial influence on the operation of the engine which will be discussed later.

Fig. 2 shows a means of admitting an auxiliary power medium. 18 represents the cylinder liner with piston 19 in its upper position. The liner is supported in the frame 20. The cylinder head 21 fits into the liner, and is held by bolts (not shown) in a customary manner. 22 shows the admission valve of the auxiliary power medium housed in a cage 23. At the upper end of this valve is a spring 24 and spring cap 25, held by nut 26. The spring cap fits snugly in the valve cage and acts as a piston. The valve cage is held in place by the bonnet 27 being flanged at the upper end and held by studs 28. The flange of the bonnet accommodates the timing valve 29 which carries a spring 30 at one end and a cam roller 31 at the other end. This spring tends to draw the roller away from the cam. Adjacent to the cam roller is the cam 32 mounted on the cam shaft 33. The auxiliary power medium is supplied through pipes 34 and 35 and through valve 36.

When the valve 36 is open, the auxiliary power medium enters the annular ring space 37 and acts upon the head of the valve 22 and below spring cap 25. Since the net area of the valve head is smaller than the net area of the spring cap, the auxiliary power medium tends to hold valve 22 tight to its seat. From the annular ring space 37 the power medium passes through drillings 38, 39, 40 and 41 into the housing of the timing valve where it acts upon the timing valve forcing it in contact with the cam.

In the position shown, the space above spring cap 25 communicates with the atmosphere by the passage 43, negative lap 44 and vent hole 45. As the cam revolves, its cavity will come adjacent to the roller 31. The roller will then enter the cavity by the pressure of the auxiliary power medium acting behind the timing valve 29. The roller 31, when moving into the cavity of the cam, permits the timing valve 29 to move toward the cam. This will close passage 44, and will open a passage for the power medium to enter from the valve chamber 42 into the passage 43 and to act upon the spring cap 25. The auxiliary power medium, acting then below and also above the spring cap 25, permits the valve 22 to open provided the pressure inside of the power cylinder is below the pressure of the auxiliary power medium. This admits the auxiliary power medium into the cylinder to act upon the working piston, until the cavity 46 of the cam 32 has passed by the roller 31, pushing the roller out of the said cavity back into the position shown in Fig. 2. In this position the valve 29 has closed again the upper end of the passage 43 for the auxiliary power medium to act upon the spring cap 25 and has reopened the passage 43 to connect with the vent hole 45. The pressure, acting from above upon the spring cap 25 is thus released causing the valve 22 to again close by the pressure acting underneath the spring cap 25.

It will be understood that the cam 32 can be timed so that the valve 22 opens at a predetermined moment. The point of closing (the "cut off") of this valve may be fixed or it may be changed to suit the load. The "cut off" of the auxiliary power medium, i. e., the distance between the points 14 to 16 and 15 to 17 (see Figs. 3 and 4) respectively may be changed by changing the length of the cam cavity 46 while the engine is in operation. This may be accomplished in the following manner: The cam 32 shown in Figs. 2 and 5 is held by a dog 50 which engages groove 51. This dog is pinned to the shaft 52 which can be shifted lengthwise. When shifting the shaft 52 the cam 32 shifts also. This shifting changes the effective length of the cam cavity as the closing end of this cavity is beveled from point 48 to 49.

The pressure of the power medium is kept at such a height that the admission of the auxiliary power medium into the working cylinder starts at a pressure indicated by points 14 and 15 respectively (see Figs. 3 and 4) which points are at or below the maximum allowable pressure $p^4$ and $p^{10}$ respectively.

When the valve 36 is closed, i. e., when no auxiliary power medium is needed, the pressure in the annular ring space 37, drillings 38, 39, 40, 41 and valve chamber 42, quickly subsides which permits the springs 30 to withdraw cam roller 31 from the cam 32.

Figs. 3 and 4 illustrate how to increase the mean effective pressure of an internal combustion engine by an auxiliary power medium in connection with supercharging. However, it is obvious that an auxiliary power medium may be used without supercharging as illustrated in Figs. 6 and 7. These two figures show in full lines the compression, combustion and expansion lines of normal indicator cards of internal combustion engines (without supercharging) working on the Diesel and Otto cycle respectively. The dash and dotted lines in Figs. 6 and 7 show an increase of the mean effective pressure inside of the working cylinder due to an auxiliary power medium. These two cards represent my preferred cycles of internal combustion engines. These cycles will meet the long felt need for increasing the overload capacity of engines of this kind without increasing either the maximum pressure or the maximum temperature inside of the working cylinder.

The auxiliary power medium that I prefer to use consists of steam that is generated in an auxiliary boiler. This boiler can be heated by the exhaust gases of the engine. Referring to Fig. 1 the auxiliary boiler is indicated by 53. The waste gases from the engine 5, enter the exhaust header 54, pass through the pipe 55 into the boiler and then into the atmosphere through the stack 56. This auxiliary boiler will be instantaneously ready to furnish a great quantity of steam when its burner, (preferably an oil burner) is started.

While it is desirable to use an auxiliary power medium of as high a temperature as possible, it should not be hotter than about 700 to 900° Fahr. otherwise difficulties with the inlet valve, admitting the auxiliary power medium to the engine, may be encountered. An auxiliary power medium having a temperature of that just mentioned can be considered cool when compared with the temperature inside of the working cylinder at a time when the combustion is just completed. This being a fact, the auxiliary power medium will absorb heat from the hot gases inside of the working cylinder and will thus reduce the need of externally cooling the cylinder by water. Therefore, admitting an auxiliary power medium into the working cylinder will reduce the heat lost and carried away by the cooling water and thus will increase the efficiency of the engine.

There may be numerous modifications made from the above outlined method and means to increase the output and efficiency of an internal combustion engine which fall within the scope of this invention. Particularly I do not wish to confine myself to the use of an auxiliary power medium when the engine is overloaded. The use of an auxiliary power medium is also recommendable at normal and lighter loads if the waste heat of the engine is called upon to generate the auxiliary power medium. In this case the thermal efficiency of the engine will be raised. Neither do I wish to confine myself to use of the Diesel or Otto cycle as modifications between the two and other cycles are practical.

What I claim is:

1. A combined internal and external combustion engine provided with means governed by the pressure in the cylinder of the engine for causing an auxiliary power medium under pressure, produced by a combustion externally of the cylinder, to be automatically admitted to the cylinder so as to increase the mean effective pressure exerted on the piston, and means for cutting off the supply of the auxiliary power medium to the cylinder before the completion of the power stroke of the piston.

2. A combined internal and external combustion engine provided with means governed by the pressure in the cylinder of the engine for causing an auxiliary power medium under pressure, produced by a combustion externally of the cylinder, to be automatically admitted to the cylinder so as to increase the mean effective pressure exerted on the piston, and an adjustable means for cutting off the supply of the auxiliary power medium to the cylinder.

3. A combined internal and external combustion engine provided with a valve for admitting to the cylinder an auxiliary power medium under pressure, produced by a combustion externally of the cylinder, and means for causing said valve to open automatically and admit the auxiliary power medium to the cylinder when the pressure in the cylinder reaches a certain approximate degree during the power stroke of the piston.

4. A combined internal and external combustion engine provided with a valve constructed so that it will open during the power stroke of the piston when the pressure in the cylinder reaches a certain approximate degree and admit to the cylinder an auxiliary power medium under pressure, produced by a combustion externally of the cylinder, and a mechanically-operated means for effecting the closing of said valve.

5. An internal combustion engine provided with a valve constructed so that it will open during the power stroke of the piston when the pressure in the cylinder reaches a certain approximate degree and admit to the cylinder an auxiliary power medium under pressure, a mechanically-operated means for effecting the closing of said valve, and means for enabling the time of closing of said valve to be varied.

6. A combined internal and external combustion engine provided with a working cylinder, an admission valve for admitting an auxiliary power medium to the cylinder, a reciprocating element for actuating said valve arranged so that the auxiliary power medium normally exerts pressure on said element in a direction to hold the valve seated, and means whereby the auxiliary power medium will exert pressure on said element in a direction to effect the unseating of said admission valve during the power stroke of the piston.

7. A locomotive equipped with an internal combustion engine for driving the locomotive, a steam boiler mounted on the chassis of the locomotive, a valve for permitting steam generated in said boiler to enter the cylinder of said engine when the locomotive is being started or when it is operated under an excessive load, said valve being so constructed and arranged that it will open automatically when the pressure in the cylinder reaches a certain approximate degree during the power stroke of the piston, a mechanically-operated means for effecting the closing of said valve, and a means for enabling the time of closing of said valve to be varied.

8. A method of operating an engine which consists in burning fuel inside of the engine in the manner common to internal combustion engines so as to generate the power required during the normal operation of said engine, burning fuel in a separate and distinct combustion chamber arranged externally of said engine for generating an auxiliary power medium under pressure, and introducing said auxiliary power medium into the cylinder of the engine during the expansion stroke and mixing it with the products of combustion in the cylinder, when the engine is excessively loaded.

9. A method of operating an engine which consists in burning fuel inside of the engine in the manner common to internal combustion engines so as to generate the power required during normal operation of the engine, burning fuel in a separate and distinct combustion chamber arranged externally of said engine for generating an auxiliary power medium under pressure, introducing said auxiliary power medium into the cylinder of said engine during the expansion stroke and mixing it with the products of combustion in the cylinder, when the engine is excessively loaded, and varying the quantity of the auxiliary power medium admitted to the cylinder in accordance with the load so as to regulate the engine.

10. A locomotive equipped with an internal combustion engine, a separate means associated with the locomotive for burning fuel in a separate and distinct combustion chamber arranged externally of said engine so as to generate an auxiliary power medium under pressure, and means for introducing said auxiliary power medium into the cylinder of the engine during the expansion stroke and mixing it with the products of combustion in the cylinder when the engine is started or when excessively loaded, thereby temporarily increasing the power of the engine and also increasing the tractive effort of the locomotive.

REINHARD HILDEBRAND.